Figure 1:
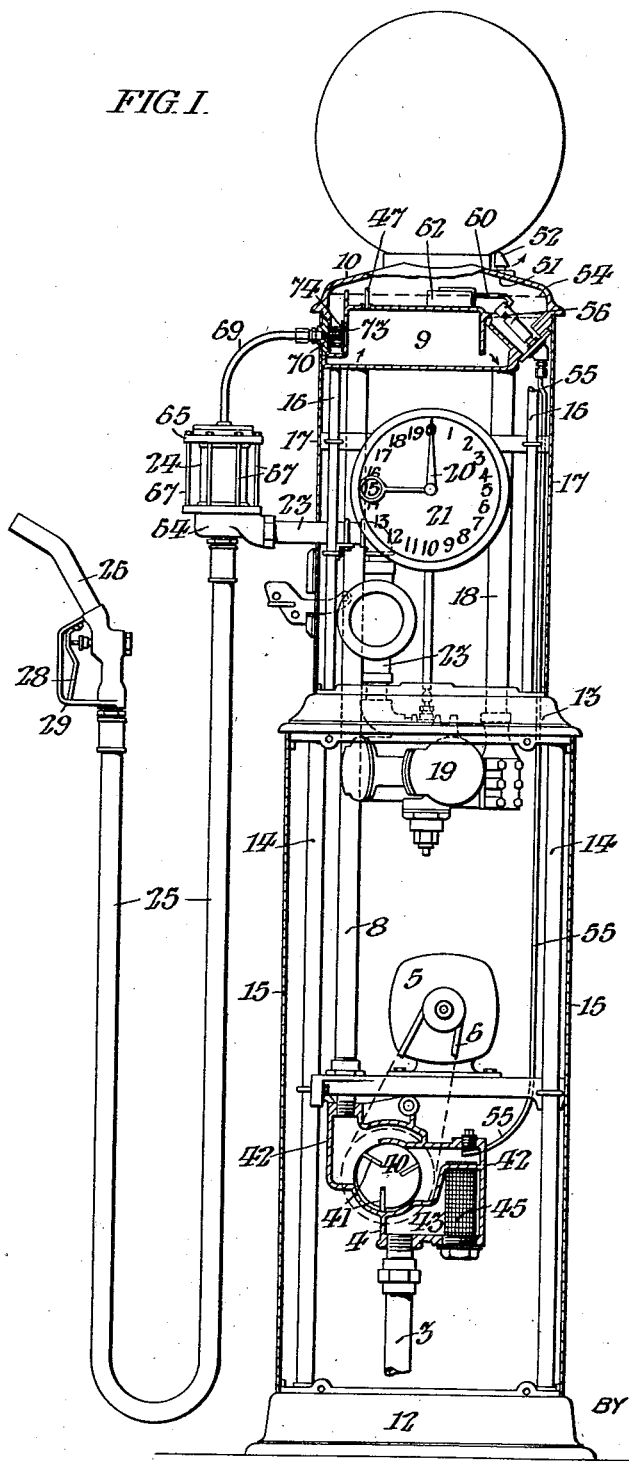

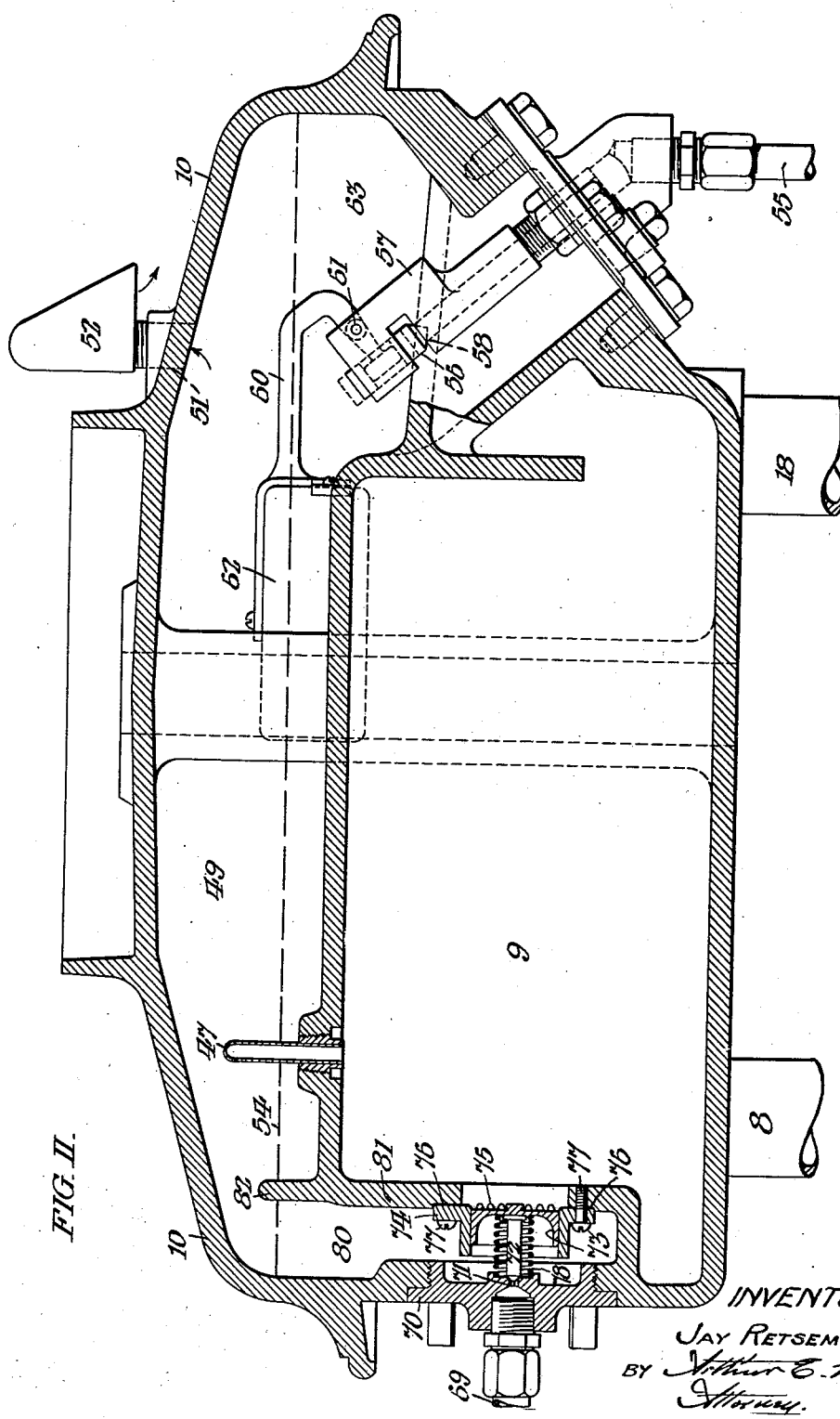

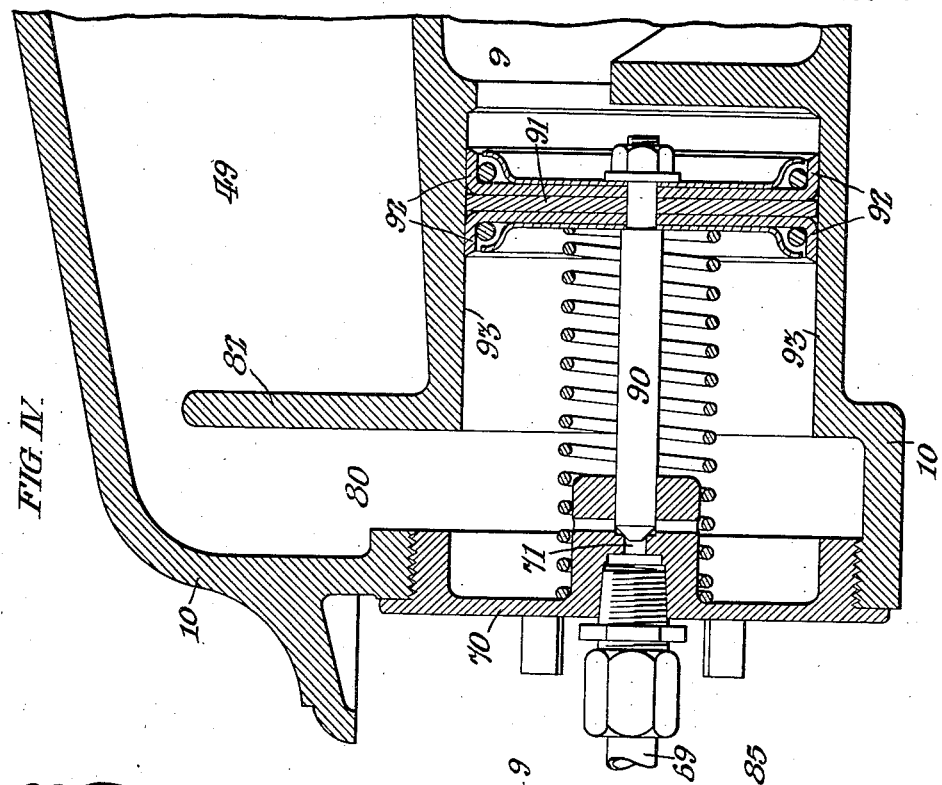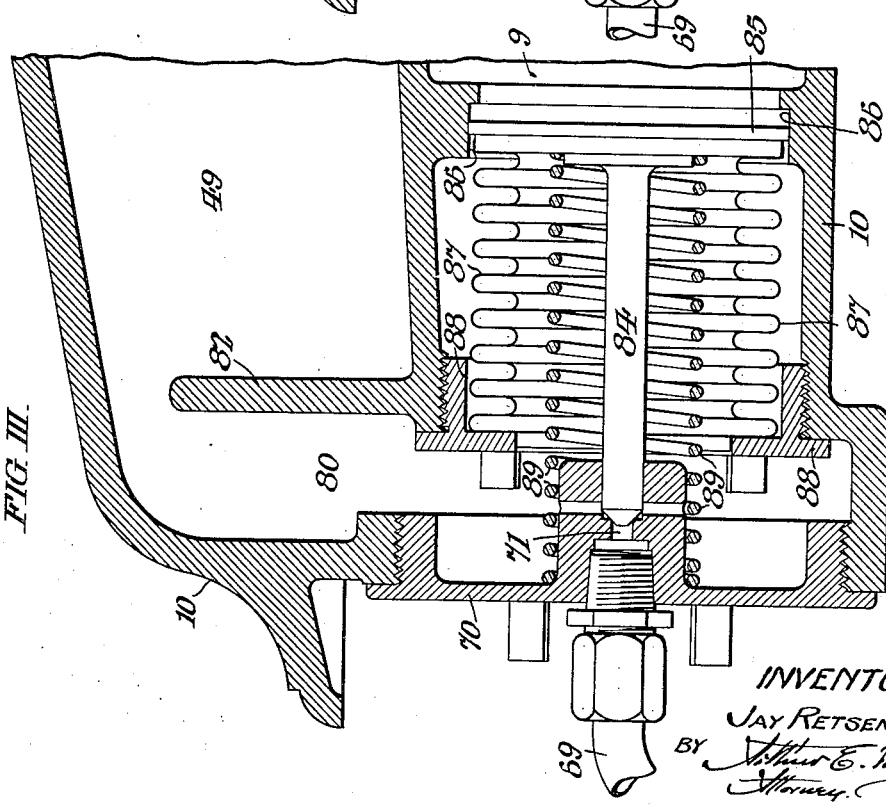

UNITED STATES PATENT OFFICE

JAY RETSEMA, OF MUSKEGON, MICHIGAN, ASSIGNOR TO SERVICE STATION EQUIPMENT COMPANY, OF CONSHOHOCKEN, PENNSYLVANIA, A CORPORATION OF DELAWARE

LIQUID DISPENSING APPARATUS

Application filed May 25, 1932. Serial No. 613,461.

My invention may be advantageously employed in apparatus for dispensing gasolene by means of a pump which extracts the liquid from a subjacent tank and delivers it under pressure through a flow meter and dispensing hose. Said meter includes a rotatable index pointer adapted to traverse a circular series of graduations on a dial to indicate gallons and fractions thereof dispensed, and said pointer is turned by the flow of fluid through said meter. In some localities the law requires the inclusion of a transparent container between the pump and the hose through which the liquid must pass and in which the purchaser may observe whether or not liquid is being delivered to the hose. If there is a leak in the suction line from the subjacent tank to the pump, air is drawn into the liquid conduit and is manifested by bubbles in the liquid passing through the container and, under some circumstances, bubbles of vapor of the liquid being dispensed may similarly appear. Of course, the passage of air or other gas through the metering pump, in lieu of liquid, renders the manifestation of the amount dispensed erroneous. Therefore, the principal purpose and effect of my invention is to insure the delivery of liquid without the inclusion of bubbles of air or vapor and to the full amount indicated by the meter.

As hereinafter described, the essential feature of my invention is that means are provided for separating the liquid from any lighter fluid, such as air or vapor of the liquid, on its way from the subjacent tank to the meter and to insure that only liquid shall be delivered thereto and dispensed therethrough. Such means includes what I hereinafter term a gas trap in the liquid dispensing conduit, located at the top of the transparent container having a gas vent leading to the atmosphere. Said vent is preferably through a conduit leading to a hollow dome at the top of the casing inclosing said pump and meter and their appurtenances, through which dome the liquid passes on its way from the pump to the meter and which dome has an opening at its top leading to the atmosphere; so that gas eliminated from the top of said transparent container may be replaced by liquid from said dome.

An essential feature of my invention is the provision of a valve controlling said vent conduit, so arranged that it is normally opened, by a spring, to permit free communication between the transparent container and said vent to the atmosphere; so that air and vapor of the liquid to be dispensed may freely escape from the hose and its appurtenances and be replaced by liquid from said trap, while the apparatus is idle, but said valve is provided with means operative by fluid pressure from the pump to close it preliminary to each liquid dispensing operation, to prevent discharge of liquid through said vent to the atmosphere.

My invention includes the various novel features of construction and arrangement hereinafter more definitely specified.

In said drawings, Fig. I is a partly sectional elevation of liquid dispensing apparatus of the type known as a curb-stand, conveniently embodying my invention.

Fig. II is a vertical sectional view of the hollow dome at the top of the pump stand casing in Fig. I, but on a larger scale, showing the vent valve operatively connected with a diaphragm.

Fig. III is a fragmentary sectional view of the left hand side of such a dome, but on a larger scale, showing a modified form of my invention wherein the means for operating the vent valve include a flexible metal bellows.

Fig. IV is a fragmentary sectional view of such a dome, on the same scale as Fig. III, but showing a modified form of my invention wherein the means for operating the vent valve include a piston, fitted to reciprocate in a cylinder.

Referring to Fig. I; the liquid to be dispensed is stored in an underground tank from which it is withdrawn through the conduit 3 by and to the pump 4 which is conveniently electrically operated by the motor 5 connected therewith by the belt 6. Said pump 4 discharges the liquid through the conduit 8 into the chamber 9 in the trap casing 10 which forms a substantially rectangular dome at the top of the curb stand. Said curb stand includes the substantially rectangular base 12 and center frame 13 connected by the vertical standards 14, surrounded by the removable sheet metal casing 15. Said center frame 13 is connected with said dome 10 by the standards 16, surrounded by the removable sheet metal casing 17.

Said chamber 9 in the trap casing 10 is connected by the conduit 18 with the flow meter 19 which includes mechanism for turning the indicator 20 with respect to graduations on the circular dial 21, to indicate the volume of fluid dispensed through said flow meter from the conduit 18 to the conduit 23. Said conduit 23 leads into the sight gage 24 which is a vessel having a transparent wall through which the quantity of liquid therein may be observed by the purchaser. When the apparatus is working properly, said sight gage 24 is continually filled with liquid which is, however, dispensable therefrom through the flexible hose 25 and nozzle 26 under control of a nozzle valve operable by the lever handle 28 within the handle guard 29 on said nozzle.

Said pump 4 is conveniently of the type including a rotor 40 having a circular series of tangential blades 41, which turn in contact with the cylindrical surface in the casing 42. Said casing 42 incloses the screen chamber 43 containing the removable screen 45 through which the liquid passes from the conduit 3 to the conduit 8.

The construction and arrangement above described are such that all of the fluid lifted by said pump 4, and including liquid, air, and other gaseous vapor, is compelled to pass through said trap chamber 9, and the lighter fluids, of course, separate from the liquid in said chamber.

In order to eliminate the gaseous fluids from said chamber 9, I provide the port 47 in the top of said chamber through which such lighter fluids may escape, into the vent chamber 49. The air and other gaseous fluid separated from the liquid in said dome casing 10 escape from said chamber 49 through the vent port 51 in the top of said dome casing 10 which is provided with the cowl 52 permitting the escape of such fluids without ingress of rain or snow.

When the liquid in said vent chamber 49 accumulates above the level indicated by the dash line 54, it is drained therefrom back to the suction side of said pump 4 through the conduit 55 shown in Fig. I, under the control of the valve 56 which is mounted to reciprocate in the valve casing 57 in registry with the port 58 leading to said conduit 55. Said valve 56 is operatively connected with the lever 60 which is fulcrumed at 61 in said casing 57 and carries at its free end the float 62.

It may be observed that the location of said drain port 58 is such that it is always submerged by liquid in the drain pocket 63, so that it is impossible for the pump to suck air or other gaseous fluid from said chamber 49 when said valve 56 is opened by the rise of liquid in said vent chamber 49.

The apparatus above described is effective to eliminate air and other fluids lighter than the liquid dispensed from such liquid on its way to the sight gage 24, but when said sight gage and hose are exposed to the heat of the sun, vapor may be generated from the gasolene therein, and, therefore, I prefer to provide means to vent such vapor from said gage and to maintain the latter always full of liquid by establishing communication between the top of said gage and the chamber 49 in said dome 10.

As shown in Fig. I; the transparent container 24 is a cylinder of glass mounted between the base fitting 64, which is supported by the conduit 23, and the cap fitting 65 which is detachably rigidly connected with said base fitting 64 by the circular series of bolts 67. Said cap fitting 65 is provided with the vent conduit 69 leading to said dome casing 10. As shown in Fig. II, said conduit terminates in the screw plug 70 in the side wall of said casing 10. Said plug 70 has the port 71 controlled by the valve 72 which is carried by the piston 73 which is mounted to reciprocate in the cylindrical bearing 74. Said valve 72 is operatively connected at its inner end with the circular diaphragm 75, the perimeter of which is clamped in the recess 76 by the flange on said bearing 74 which is conveniently secured in said casing 10 by a circular series of screws 77. As shown in Fig. II, said valve 72 is closed by liquid pressure upon said piston 73 and diaphragm 75; that pressure being afforded by the pump 4 whenever the latter is operated and preliminary to a dispensing operation. Although said valve 72 is subjected to the same fluid pressure in opposite directions, it presents through the port 71 an area so much smaller than that of the piston 73 as to be closed to the position shown in Fig. II by a pressure of less than two pounds per square inch; although said valve is adapted to be normally opened by the spring 78 compressed between said screw plug 70 and said piston 73. Therefore, when the pump 4 is idle, during the intervals between liquid dispensing operations, there is free communication between the sight gage 24 and the sump chamber 80 formed by the vertical partition 81 in said dome casing 10, and in communication with the vent chamber 49 at the top thereof; so that air or other gaseous fluid may escape from the hose 25 through said sight gage 24 to the atmosphere through the vent port 51 in the top of said dome casing 10 and be replaced by liquid caught in said trap and normally at the level 54, from which it gravitates into said sight gage.

As the glass vessels 24 are sometimes accidentally broken, it is desirable to minimize the amount of gasolene which may thus accidentally escape from the dome casing 10. Therefore, I prefer to provide the latter with the fence 82 which is high enough to retain in the chamber 49 sufficient liquid to maintain the drain port 58 submerged regardless of a leak through which the liquid above said fence may escape through the broken sight gage.

It is to be understood that the pressure of the pump may be applied to the valve 72 to close the port 71 by any convenient means other than that shown in Fig. II. For instance, as shown in Fig. III, the vent port 71 is controlled by the valve 84 which is substituted for the valve 72, and which is operatively connected with the piston 85 mounted to reciprocate in the cylindrical bore 86 in the dome casing 10, and a fluid tight joint is made between said piston and the casing 10 by the corrugated metal bellows 87 which is attached at its inner end to the piston 85 and at its outer end to the screw plug 88 which is tightly fitted in said casing 10. The spring 89 acts like said spring 78 to normally shift said valve 84 to open the port 71 when said piston 85 and bellows 87 are relieved of the pressure in the chamber 9 afforded by the operation of the pump. That construction permits the operation of the valve 84 with the minimum amount of friction in the casing.

In Fig. IV, I have shown another modification of the means for applying the pump pressure to close the port 71 by the valve 90, including the piston 91 comprising cups of leather or other flexible material 92 mounted to reciprocate in the cylindrical bore 93 in the dome casing 10. I find that the latter form is less costly to manufacture than either of the forms shown in Figs. II and III.

Therefore, I do not desire to limit myself to the precise details of construction and arrangement herein set forth, as it is obvious that various modifications may be made therein without departing from the essential features of my invention, as defined in the appended claims.

I claim:

1. In liquid dispensing apparatus; the combination with a hollow pump stand having a liquid trap casing at the upper portion thereof with a gas vent to the atmosphere; of a liquid meter inclosed by said stand; a pump inclosed by said stand having an intake conduit for connection with a liquid supply and a discharge conduit for conducting liquid from said pump through said meter; a liquid dispensing conduit from said meter; a transparent liquid container included in said liquid dispensing conduit; a conduit extending from the top of said transparent container to said trap in communication with the atmosphere; a valve controlling the last named conduit; a spring continually stressing said valve toward its open position; and means operatively connected with said valve for closing the latter by pressure of fluid from said pump; whereby said liquid dispensing conduit and transparent container are normally in communication with said trap and the outer atmosphere for elimination of air and gaseous fluids from the liquid therein and replacement of the eliminated fluids with liquid from said trap; but said valve is closed to prevent such communication with the atmosphere during the dispensing operation of said pump.

2. Apparatus as in claim 1; wherein said valve is located in said trap casing.

3. Apparatus as in claim 1; wherein the means for closing said valve by pressure from said pump include a piston connected with said valve.

4. Apparatus as claim 1; wherein the means for closing said valve by pressure from said pump include a flexible metal bellows connected with said valve.

5. Apparatus as in claim 1; wherein said trap is provided with a drain conduit and a float valve controlling the same, for retaining liquid in said trap below a predetermined level and permitting escape of said liquid to the suction side of said pump when it accumulates above said predetermined level.

6. Apparatus as in claim 1; wherein said trap is included in the liquid dispensing conduit, so that all of the liquid dispensed must pass through said trap.

7. Apparatus as in claim 1; wherein said trap is included in the liquid dispensing conduit, so that all of the liquid dispensed must pass through said trap; and said trap is provided with a liquid drain conduit and a float valve controlling the same; whereby liquid from which lighter fluids have been eliminated is prevented from rising above a predetermined level in said trap and permitted to escape to the suction side of said pump when it accumulates above that level.

8. In liquid dispensing apparatus; the combination with a pump having an intake conduit for connection with a liquid supply, and a liquid discharge conduit; of a liquid meter connected with said pump discharge conduit; a liquid dispensing conduit from said meter; a liquid trap at the upper portion of said apparatus, in communication with said dispensing conduit, and having a fluid vent to the atmosphere; a valve controlling communication between said dispensing conduit and said trap; a spring continually stressing said valve toward its open position; and means operatively connected with said valve for closing the latter by pressure of fluid from said pump; whereby said liquid dispensing conduit is normally in communication with said trap and the outer atmosphere for elimination of air and gaseous fluids from the liquid therein and replacement of the eliminated fluids with liquid from said trap; but said valve is closed to prevent such communication with the atmosphere during the dispensing operation of said pump.

9. Apparatus as in claim 8; wherein said valve is located in said trap.

10. Apparatus as in claim 8; wherein said trap is located between said pump and said meter, so that all of the liquid dispensed must pass through said trap.

11. Apparatus as in claim 8; wherein said trap is located between said pump and said meter, so that all of the liquid dispensed must pass through said trap; and said trap is provided with a liquid drain conduit leading to the suction side of said pump, and a float valve controlling that conduit; whereby liquid from which lighter fluids have been eliminated is permitted to escape to the suction side of said pump when it accumulates above a predetermined level in said trap.

In testimony whereof, I have hereunto signed my name at Muskegon, Michigan, this 11th day of May, 1932.

JAY RETSEMA.